March 24, 1931.   W. B. CHURCHER   1,797,545
VEHICLE WHEEL
Filed Aug. 6, 1929
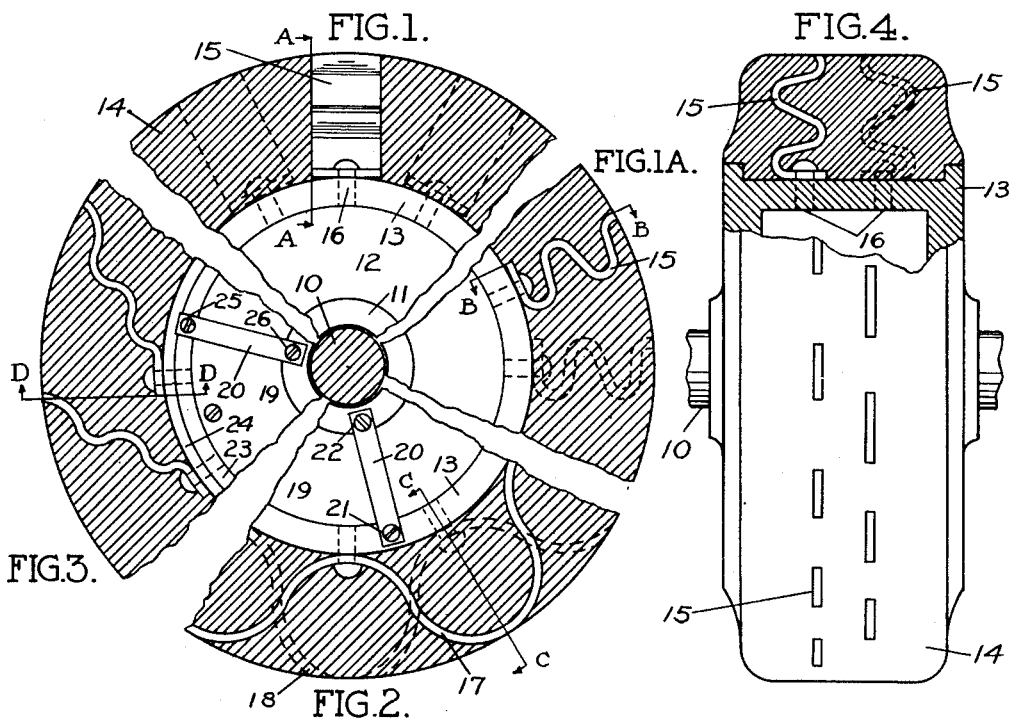
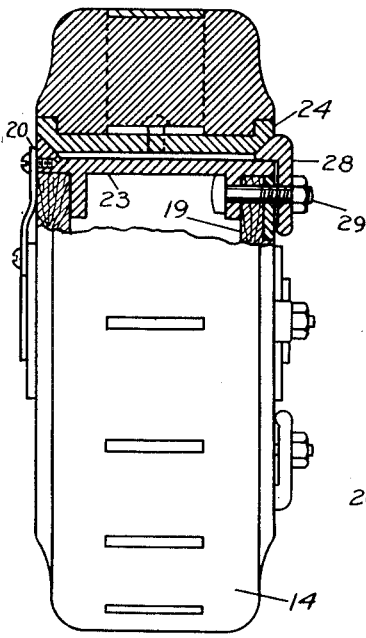
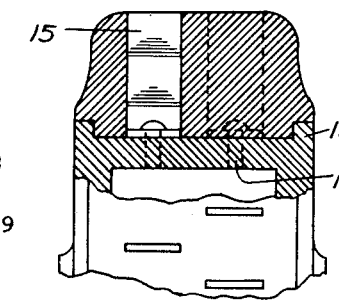  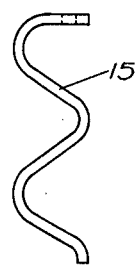
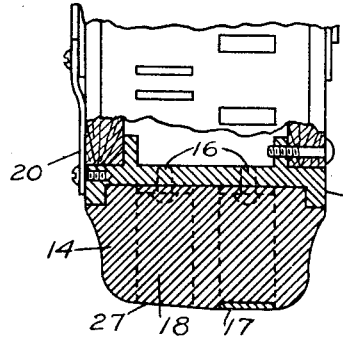
INVENTOR
William B. Churcher Patented Mar. 24, 1931

1,797,545

UNITED STATES PATENT OFFICE

WILLIAM B. CHURCHER, OF BALTIMORE, MARYLAND, ASSIGNOR TO THE GLENN L. MARTIN CO., OF BALTIMORE, MARYLAND, A CORPORATION OF MARYLAND

VEHICLE WHEEL

Application filed August 6, 1929. Serial No. 383,884.

My invention relates to wheels associated with vehicles in which metal predominates in their construction.

The principal object of my invention is to dissipate an electrical charge from the metal body of a vehicle.

Another object of my invention is to provide a static discharge path from a vehicle body to ground which is not subject to failure.

Another object is to make it unnecessary to depend upon the attachment of a temporary ground wire from the vehicle to ground while the fuel tank is in process of filling, a duty which may be overlooked by the attendant.

It is a well known fact that under certain conditions a static charge exists on a truck, an oil tank wagon, all-metal airplane, or an airship, and that the potential between the vehicle and ground may rise to a high value. This charge is ordinarily generated by friction of gasoline passing through a dielectric medium and unless neutralized it will jump from the metal gasoline tank to the nozzle of a filling pipe thus igniting the gasoline with obviously disastrous results. Fires and loss of life have occurred due to the absence of effective precautionary measures or the neglect of such measures when and if provided. The conventional practice in the construction of trucks used for haulage of gasoline is to provide a trailing metal chain or cable as a path for static discharge to ground which method is effective until the end of the chain wears away and thereafter fails to touch the ground. Also, when the truck body rises due to a lightening of the load the electrical connection to ground may be broken.

A metal trailing cable or chain trailing from an aircraft is obviously prohibitive.

The conventional practice in the past was to equip airplanes with metal tail skids which automatically provided an effective electrical path from the body to ground. The substitution of rubber tired wheel tail skids for metal skids introduced a potential source of danger from fire because of the effective electrical insulation provided by the rubber tired landing wheels and a rubber tired tail skid wheel between the vehicle and the ground.

During the act of filling the fuel tank, the only available path to ground for an accumulated static charge is then by way of the gasoline filling nozzle through the metal armored hose to ground. In the event that the nozzle fails to maintain contact with the filler neck of the tank a spark may occur and ignite the fuel or the vapor arising therefrom.

The instant invention provides an ever present and effective discharge path for an electrical charge, one which is not subject to failure due to neglect, to accidental detachment or to wearing away to an ineffective length of a grounding conductor dependent from the vehicle body.

The application and operation of my device will be understood by reference to the accompanying drawings and their interpretation in the specification and claims. I have described and illustrated preferred embodiments of my invention but it will be obvious that considerable variation may be made in the application of the principle involved and yet adhere to the underlying principle of my invention which is based on providing electrical discharge paths from a metal body to the ground engaging portion of a wheel at a sufficient number of intervals around the circumference as will assure an electrical contact to ground at any position of the wheel during fuel servicing of the vehicle.

Fig. 1 is a circumferential cross-section of the tire mounted on a wheel.

Fig. 1A is similar to Fig. 1 but showing a modification of the tire.

Figs. 2 and 3 are similar views to Fig. 1 each showing a modification of the tire and the wheel.

Fig. 4 is a transverse cross-section A—A of the modification shown in Fig. 1.

Fig. 5 is a transverse cross-section B—B of the modification shown in Fig. 1A.

Fig. 6 is a transverse cross-section C—C of the modification shown in Fig. 2.

Fig. 7 is a transverse cross-section D—D of the modification shown in Fig. 3 and showing in partial cross section the application of the invention where the tire is demountably attached to a dielectric wheel.

Fig. 8 is a plan view of a typical metal insert.

Fig. 9 is an edge view of Fig. 8.

In Fig. 1 a cross-section of a portion of an axle is shown at 10. The axle is attached to the vehicle in a conventional manner not shown. Axle engaging portion 11 of metal wheel 12 is adapted to revolve on axle 10. Wheel body 12 includes a rim 13 upon which tire 14 is mounted. Tire 14 is fabricated from an insulating material and a multiple number of metal inserts 15 are arranged in a manner whereby they are exposed at the ground engaging portion of the tire and form a continuous electrical path to the rim of the wheel to which they are positively fastened at 16.

Fig. 1A differs from Fig. 1 in respect to the position of resilient inserts 15 relative to the tire but their electrical function is not affected.

Fig. 2 differs from Figs. 1 and 1A in that the formation of resilient inserts 17 and 18 differs from inserts 15, and that rim 13 to which they are positively attached is mounted on a non-metal body 19. Electrical bond 20 is attached to rim 13 at 21 and to the axle engaging portion of the wheel at 22.

Fig. 3 differs from Fig. 2 in the formation and location of inserts and a demountable metal rim 23—24 is shown attached in a conventional manner to non-metal wheel body 19. An electrical bond 20 is attached to a portion of the rim at 25 and to the axle engaging portion of the wheel at 26 in order to complete the electrical path. In the event that the demountable rim is attached to a metal body such as indicated in Figs. 1 and 1A electrical bond 20 is not required.

In Figs. 1, 1A, 2 and 3 the electrical path from the ground engaging inserts to the axle is completed by rotative contact with axle 10.

Fig. 4 is a view of a type of complete wheel mounted on axle 10. Tire 14 is sectioned at A—A of Fig. 1 and the body portion 12 is integral with rim 13 to which inserts 15 are positively attached at 16.

Fig. 5 is a view of a portion of a wheel in which the tire is sectioned at B—B of Fig. 1A wherein the inserts are arranged in a different relation to the tire from that shown in Fig. 4.

Fig. 6 is a view of a portion of a wheel in which the tire is sectioned at C—C of Fig. 2 and the body portion of the wheel is fabricated from a non-metal material. Tire 14 is attached to rim 13, and inserts 17—18 are positively attached to the rim at 16. The electrical circuit from the rim to the axle engaging portion of the wheel is completed by metal bond 20. The initial formation of the inserts is indicated at 17 and when the tire is worn as indicated at 27 the inserts are cut through as indicated at 18.

Fig. 7 is a view of a type of complete wheel in which a portion is sectioned at D—D corresponding to Fig. 3 to more clearly indicate demountable rim 23—24 in attached relation to non-metal body 19. A positive electrical connection is maintained between rim 23 and rim 24 by wedges 28 held in position by bolts 29. Bond 20 is used to electrically connect the composite rim to the axle engaging portion of a wheel having a non-metal body but can be omitted when a metal body is used.

Resiliency of a soft rubber tire is maintained by forming the inserts in a manner substantially as indicated in the drawings. The circumferential relation of the inserts to one another is such that contact with the ground by one, or more than one, of the inserts is certain in any operative position of the wheel and the series connections between the axle, the inserts, and the ground assures a neutralization of high potential difference which will otherwise exist between the ground and the metal of the vehicle when subjected to conditions which are favorable to generation of static electricity.

The following claims are based on the objectives enumerated in the specification.

1. In a vehicle wheel, a dielectric non-metal ground engaging member adapted to rotative mounting on an axle of a vehicle; a multiple number of metal inserts in said member, said inserts exposed at the ground engaging portion of said member and means for electrically connecting said inserts to an axle.

2. In a vehicle wheel, a resilient dielectric ground engaging member adapted to rotative mounting on an axle of a vehicle; a multiple number of metal inserts in said member, said inserts being formed and disposed to maintain resiliency of said member; said inserts exposed at the ground engaging portion of said member; and means for electrically connecting the ground engaging inserts to an axle.

3. In a vehicle wheel, a resilient dielectric ground engaging member mounted on a metal hub adapted to rotative mounting on an axle of a vehicle; a multiple number of metal inserts in said member, said inserts being formed and disposed to maintain resiliency of said member; said inserts exposed at the ground engaging portion of said member and positively connected to said hub; said hub adapted to make electrical connection with an axle.

4. In a vehicle wheel, a dielectric ground engaging member mounted on a metal rim; a non-metal wheel body attached to said rim; a metal bearing attached to said body and adapted to collective rotation of said member with said body and rim on an axle of a vehicle; a multiple number of metal inserts exposed at the ground engaging surface of said member and remote portions of said inserts positively and directly connected to said rim; and said rim electrically bonded to said bearing.

5. In a vehicle wheel, a dielectric ground engaging member mounted on a metal rim; a multiple number of metal inserts in said member, said inserts exposed at ground engaging portion of said member and positively attached to said rim; said rim positively attached in electrical contact with a second metal rim; said second rim attached to a body including a metal bearing; said bearing being electrically connected to said second rim and adapted to make rotative electrical contact with an axle.

6. In a vehicle wheel, a dielectric ground engaging member mounted on a metal rim; a multiple number of metal inserts in said member, said inserts exposed at the ground engaging portion of said member and positively attached to said rim; said rim positively attached in electrical contact with a second metal rim; said second rim attached to a dielectric body mounted on a metal bearing; said bearing being electrically bonded to said second rim and adapted to make rotative electrical contact with an axle.

In testimony whereof, I hereunto affix my signature.

WILLIAM B. CHURCHER.